United States Patent
Chowdhary et al.

(10) Patent No.: US 8,671,084 B2
(45) Date of Patent: *Mar. 11, 2014

(54) UPDATING A DATA WAREHOUSE SCHEMA BASED ON CHANGES IN AN OBSERVATION MODEL

(75) Inventors: Pawan R. Chowdhary, Montrose, NY (US); Hui Lei, Scarsdale, NY (US); George Andrei Mihaila, Yorktown Heights, NY (US); Themis Palpanas, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,886

(22) Filed: Jul. 1, 2011

(65) Prior Publication Data

US 2011/0264636 A1  Oct. 27, 2011

Related U.S. Application Data

(63) Continuation of application No. 12/146,782, filed on Jun. 26, 2008, now Pat. No. 8,024,305, which is a continuation of application No. 11/455,299, filed on Jun. 15, 2006, now Pat. No. 7,418,453.

(51) Int. Cl.
*G06F 7/00* (2006.01)
(52) U.S. Cl.
USPC .......................................... 707/695; 707/806

(58) Field of Classification Search
USPC ...................... 707/802, 803, 790, 695, 999.1, 707/999.101, 999.404–999.107, 806
See application file for complete search history.

(56) References Cited

U.S. PATENT DOCUMENTS

| | | | | |
|---|---|---|---|---|
| 5,233,513 A * | 8/1993 | Doyle | ........................... | 705/7.11 |
| 6,671,689 B2 * | 12/2003 | Papierniak | ........................... | 1/1 |
| 7,072,899 B2 * | 7/2006 | Lokken | ................................ | 1/1 |
| 7,418,453 B2 * | 8/2008 | Chowdhary et al. | ................... | 1/1 |
| 8,001,527 B1 * | 8/2011 | Qureshi et al. | ................. | 717/120 |
| 8,024,305 B2 * | 9/2011 | Chowdhary et al. | .......... | 707/695 |
| 2002/0099710 A1 * | 7/2002 | Papierniak | ..................... | 707/100 |
| 2005/0071359 A1 * | 3/2005 | Elandassery et al. | ......... | 707/102 |
| 2005/0138020 A1 * | 6/2005 | Lokken | ............................ | 707/3 |
| 2006/0195492 A1 * | 8/2006 | Clark et al. | ................... | 707/204 |
| 2006/0294158 A1 * | 12/2006 | Tsyganskiy et al. | .......... | 707/202 |

* cited by examiner

*Primary Examiner* — Hung T Vy
(74) *Attorney, Agent, or Firm* — Thomas Grzesik; Fleit Gibbons Gutman Bongini & Bianco PL

(57) ABSTRACT

A method, information processing system, and computer readable medium for modifying at least one data warehouse schema based on detected changes in an associated observation model are disclosed. The method includes determining if at least one new observation model has been created. The method also includes determining if at least one existing observation model is associated with the new observation model. In response to the existing observation model being associated with the new observation model, at least one changed attribute is identified by comparing the new observation model and the existing observation model. A set of files associated with the existing observation model is updated to reflect the changed attribute between the new observation model and the existing observation model.

20 Claims, 9 Drawing Sheets

UPDATING A DATA WAREHOUSE SCHEMA BASED ON CHANGES IN AN OBSERVATION MODEL

CROSS-REFERENCE TO RELATED APPLICATIONS

This application is based upon and claims priority from prior U.S. patent application Ser. No. 12/146,782, filed on Jun. 26, 2008, now U.S. Patent Number [Allowed] and U.S. patent application Ser. No. 11/455,299, filed on Jun. 15, 2006, now U.S. Pat. No. 7,418,453, the entire disclosure of which are herein incorporated by reference in their entirety.

FIELD OF THE INVENTION

The present invention generally relates to the field of data warehousing, and more particularly relates to propagating changes in an observation model to one or more data warehouse schemas.

BACKGROUND OF THE INVENTION

Businesses are getting more event-driven and adaptive in nature. They are exposed to large amounts of data every day. For Sense and Respond and Business Process Monitoring (BPM), this data needs to be transformed and stored in a database for analysis purposes. Once stored, for example, in a data warehouse businesses use the stored data for analyzing business activities and performing decision making tasks. Traditional data warehouse schemas are designed, in general, independent from the business process and source data. Another type of data warehousing is adaptive data warehousing, as is described in the co-pending U.S. patent application Ser. No. 10/994,232 filed Nov. 23, 2004, entitled "Adaptive Data Warehouse Meta Model", which is commonly owned by International Business Machines and is hereby incorporated by reference in its entirety.

Businesses typically use a business operations models ("BOM") and observation models ("OM") when modeling particular aspects of the business. BOMs generally comprise several packages that include constructs to model a particular aspect of business operations (e.g. processes, resources, information structure, and the like). An OM covers business performance management, which comprises business performance monitoring (observation) and control. OMs are typically constructed top-down starting from the business metrics or key performance indicators ("KPI") that are to be observed. OMs can also be constructed from business situations that are to be monitored and the metrics needed for defining the business situations.

Monitoring contexts for processing specific events can be designed using OMs. For each relevant incoming event, a monitoring context will typically compute one or more metrics. These metrics are stored in a data warehouse for subsequent analysis. In the context of the data warehouse, some of these metrics are treated as dimensions (e.g. Customer, Time, Location, and the like) and the others as measures (e.g. Revenue, Cost, Profit, and the like). As part of the model-driven approach to design, a database schema of the data warehouse is generated from the OM.

One problem with current data warehouse models is in the way updated OMs are handled. For example, when a new version of an exiting OM is created, the associated data warehouse schema is re-generated. This requires the migration of the already collected data to the new data warehouse schema associated with the new OM. The migration of data causes unnecessary downtime of the data warehouse and disruption of existing data.

Therefore a need exists to overcome the problems with the prior art as discussed above.

SUMMARY OF THE INVENTION

Briefly, in accordance with the present invention, disclosed are a method, information processing system, and computer readable medium for modifying at least one data warehouse schema based on detected changes in an associated observation model are disclosed. The method includes determining if at least one new observation model has been created. The method also includes determining if at least one existing observation model is associated with the new observation model. In response to the existing observation model being associated with the new observation model, at least one changed attribute is identified by comparing the new observation model and the existing observation model. A set of files associated with the existing observation model is updated to reflect the changed attribute between the new observation model and the existing observation model.

In another embodiment of the present invention, an information processing system for modifying at least one data warehouse schema based on detected changes in an associated observation model is disclosed. The information processing system includes an observation model comparator for determining if at least one new observation model has been created. The observation model comparator also determines if at least one existing observation model is associated with the new observation model. The observation model comparator identifies, in response to the existing observation model being associated with the new observation model, at least one changed attribute by comparing the new observation model and the existing observation model. The information processing system also comprises a data schema updater for updating a set of files associated with the existing observation model to reflect the changed attribute between the new observation model and the existing observation model.

In yet another embodiment, a computer readable medium for modifying at least one data warehouse schema based on detected changes in an associated observation model. The computer readable medium includes instructions for determining if at least one new observation model has been includes determining if at least one new observation model has been created. The method also includes determining if at least one existing observation model is associated with the new observation model. In response to the existing observation model being associated with the new observation model, at least one changed attribute is identified by comparing the new observation model and the existing observation model. A set of files associated with the existing observation model is updated to reflect the changed attribute between the new observation model and the existing observation model.

One advantage of the present invention is that new data schemas for updated observation models are not required. Existing data schemas are updated to reflect the changes in new observation models, thereby minimizing data warehouse downtime and disruption of existing data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
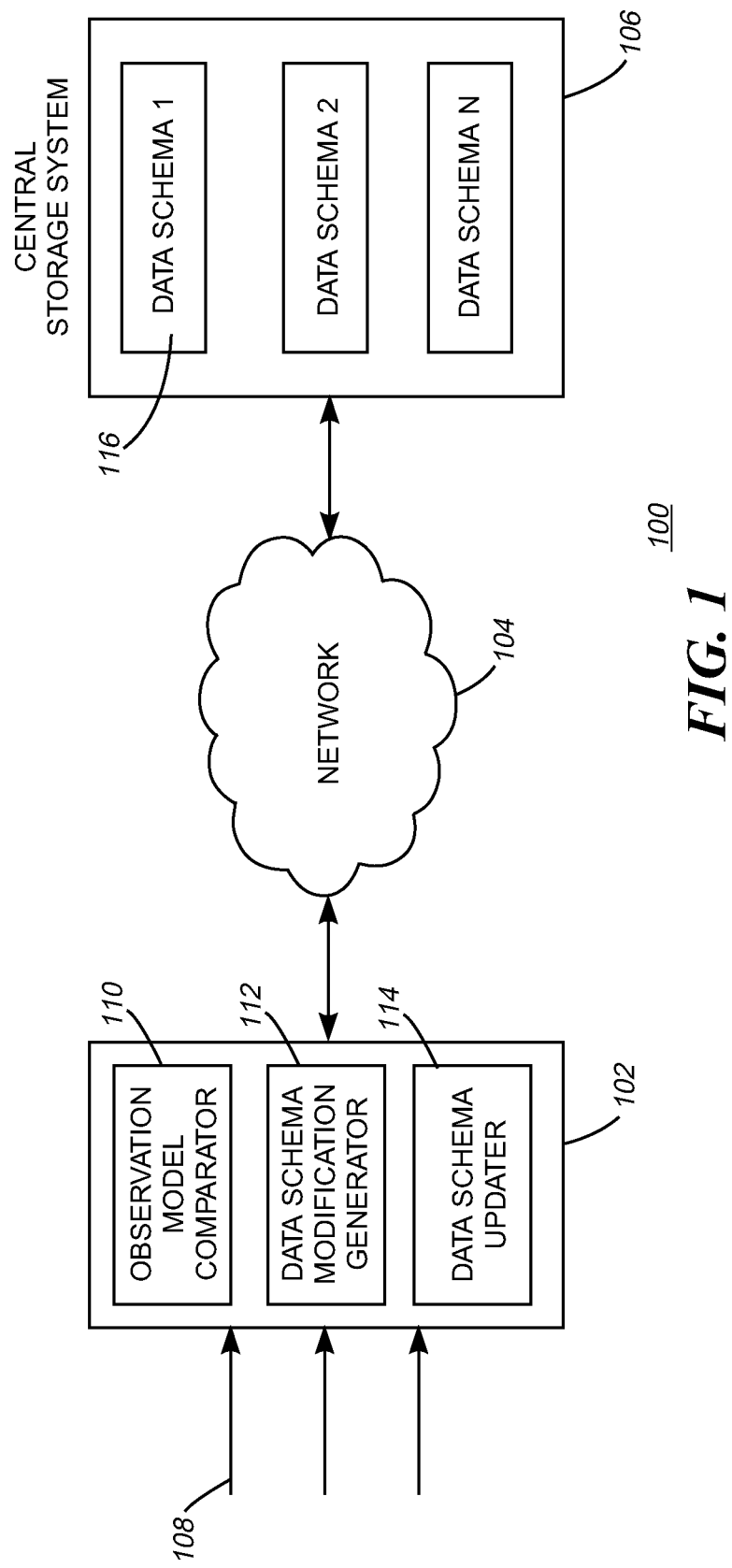
FIG. 1 is a block diagram illustrating an exemplary system, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary System

According to an embodiment of the present invention, as shown in FIG. 1, an exemplary system 100 for updating data warehouse schemas is shown. In one embodiment, the system 100 includes one or more information processing systems 102, a network 104, and one or more central storage systems 106. The network 104, in one embodiment, is a wide area network, local area network, wireless network, and the like. The information processing system 102, in one embodiment, is the information processing system used for defining meta data, generating and deploying data schemas, configuring data staging and data management components, generation of downstream meta data, and the like, as described in the U.S. patent application Ser. No. 10/994,232 filed Nov. 23, 2004, entitled "Adaptive Data Warehouse Meta Model", which is commonly assigned to International Business Machines herewith and is incorporated by reference in its entirety. The system 100 also includes inputs streams 108 that comprise data to be processed by the information processing system 102. The data can be events to be processes by a monitoring context, new observation model information transmitted from another information processing system, and the like.

The information processing system includes an observation model comparator 110, a data schema modification generator 112, and a data schema updater 114, which are described in greater detail below. The central storage system 106, in one embodiment, is a data warehouse comprising data schemas 116 associated with one or more observation models. The information processing system 102, in one embodiment, updates the data schemas 116 based on new observation models.

Exemplary Information Processing System

Figure 2:
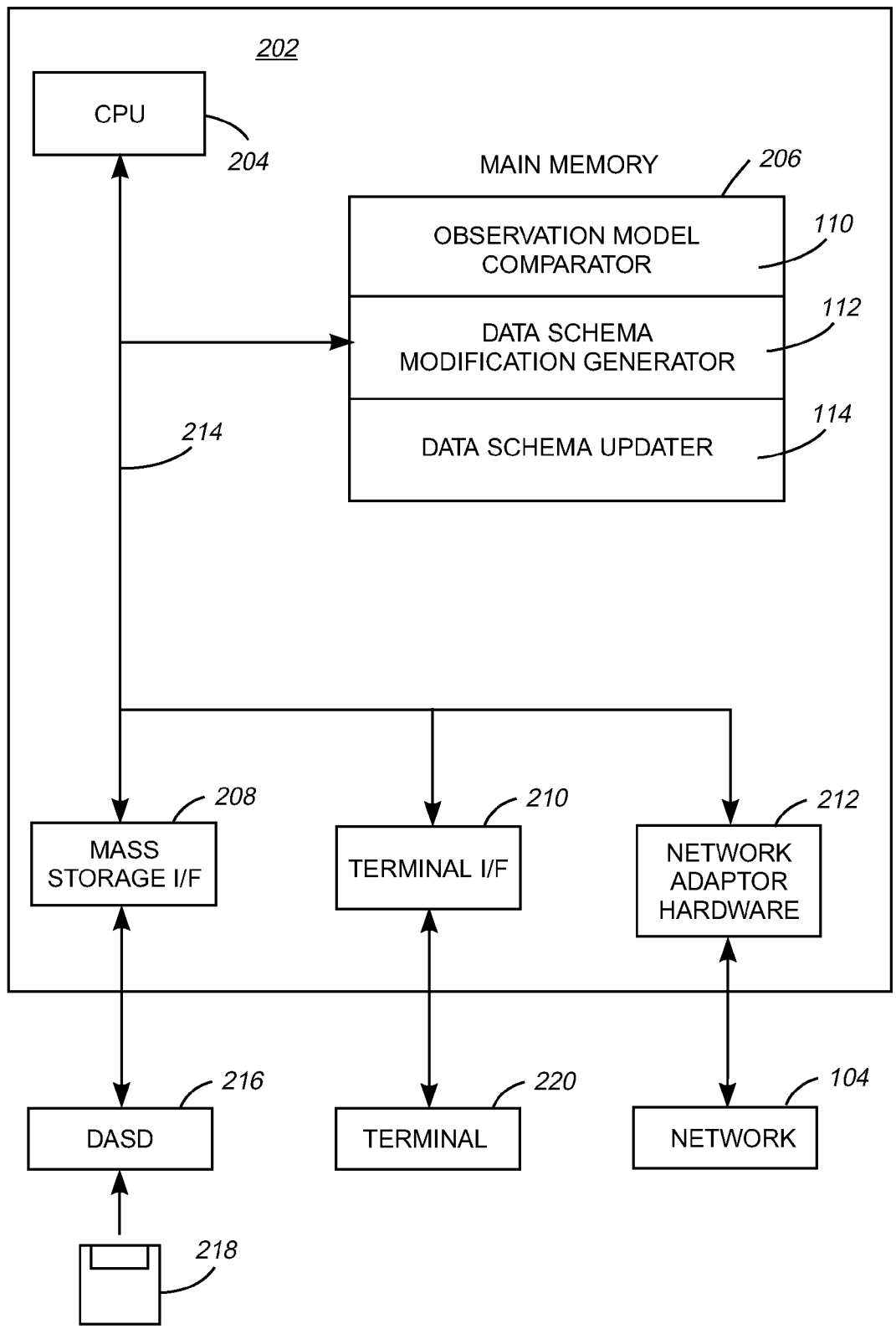
FIG. 2 is a block diagram illustrating a more detailed view of an information processing system, according to an embodiment of the present invention.

FIG. 2 is a block diagram illustrating a more detailed view of the information processing system 102, according to the present invention. The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102 system. One specific type of data storage device is a computer readable medium such as a CD drive, which may be used to store data to and read data from a CD or DVD 218 or floppy diskette CD (not shown). Another type of data storage device is a data storage device configured to support, for example, NTFS type file system operations.

The main memory 206 comprises the observation model comparator 110. The observation model comparator 110 compares an existing OM to a new OM to determine if any differences exist between them. For example, as described in the co-pending U.S. patent application Ser. No. 10/994,232 filed Nov. 23, 2004, entitled "Adaptive Data Warehouse Meta Model", the data structure of businesses change and therefore OMs are not static. An initial version of an OM can have subsequent versions each with varying changes. As described above, traditional data warehouse systems re-migrate existing data into new data schemas associated with the new OMs. The present invention, on the other hand, allows for the changes between existing OMs and new OMs to be propagated through the data warehouse 106 utilizing already existing data sets such as fact tables, dimensions tables, and the like. The present invention prevents the disruption of existing data and minimizes and/or eliminates downtown of the data warehouse 106.

The new OMs, in one embodiment, are received from the input streams 108. In another embodiment, the new OMs are generated within the information processing system 102. The already existing OMs reside within the information processing system 102 or on another information processing system (not shown) communicatively coupled to the information processing system 102. The observation model comparator 110 identifies the differences between the OMs. Differences between OMs, in one embodiment, are within monitoring contexts of the OMs. One identifiable difference is a newly added measure metric such as quantity. Another identifiable difference between an existing OM and a new OM is the removal of an existing measure metric. The observation model comparator 110 can also identify if an existing measure metric has been renamed or if a new dimension metric has been added. The removal of existing dimension metrics and/or the renaming of existing dimension metrics are also identifiable by the observation model comparator 110. The observation model comparator also identifies if a new monitoring context has been added or if an existing monitoring context has been removed by the new OM.

In one embodiment, the main memory 206 also includes a data schema modification generator 112, which processes the changes identified in the new OM by the observation model comparator 110 for updating an associated data schema 116. The main memory 206 also includes, in one embodiment, a data schema updater 114, which updates a data schema 116 associated with an existing OM.

Figure 5:
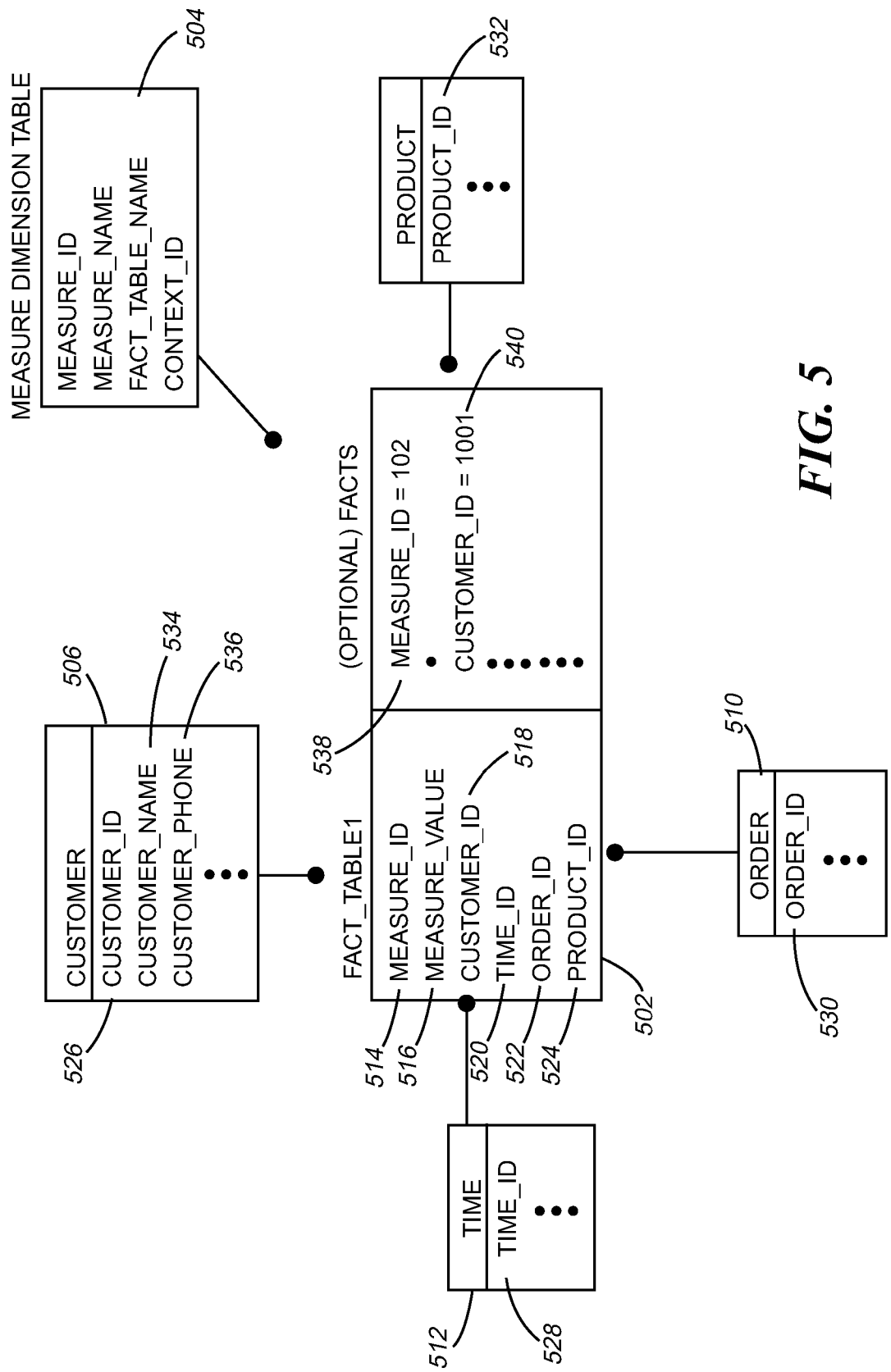
FIG. 5 is an exemplary star schema for a data warehouse schema, according to the present invention.

For example, if the change in the new OM is the addition of a measure metric, no change occurs in the associated warehouse data schema 116. The data for the new measure metric is stored in an existing fact table (FIG. 5) for the given monitoring context. A measure dimension table also associated with the monitoring context is also updated to reflect the change identified in the new OM. A fact table (FIG. 5), in one embodiment, includes metrics (facts), measurements, and the like of a specific process such as a business process being monitored. A fact table (FIG. 5) also includes foreign keys that refer to primary keys in a dimension table (FIG. 5). A dimension table (FIG. 5), in one embodiment, includes attributes/fields used to constrain and group data during a data warehouse query. The fact table and dimension table are discussed in greater detail below.

Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the information processing system 102. The terminal 220 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 102. The network adapter hardware 212 is used to provide an interface to the network 104. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Exemplary System Architecture

Figure 3:
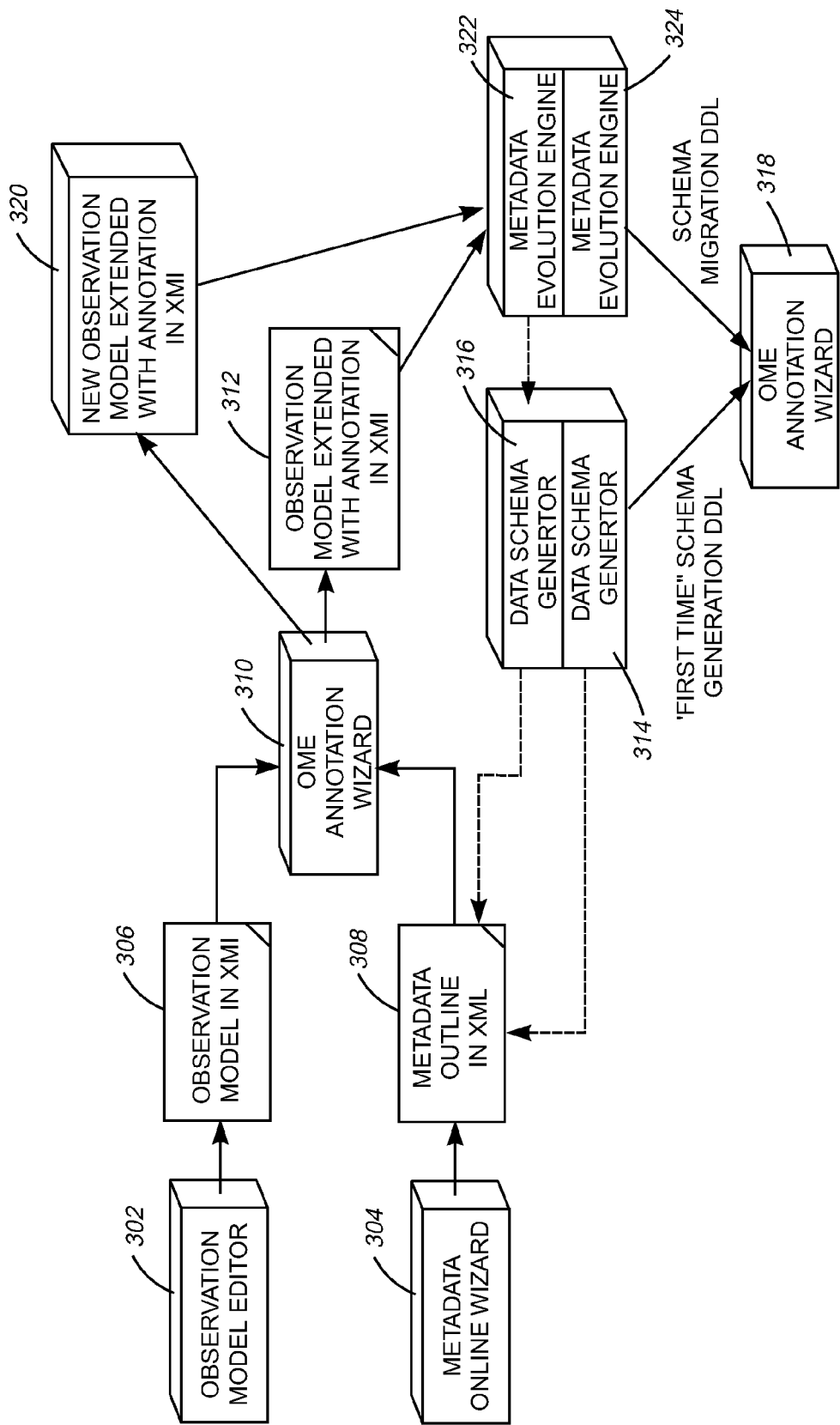
FIG. 3 is a block diagram illustrating an exemplary system architecture for updating data warehouse schemas based on changes in an observation model, according to an embodiment of the present invention.

FIG. 3 illustrates an exemplary system architecture according to the system of FIG. 1. The logic flow diagram of FIG. 3 shows an observation model editor 302 and a metadata outline wizard 304. The observation model editor 302, in one embodiment, creates an observation model to be used for a monitoring and analysis process. The observation model editor 302 also generates one or more monitoring contexts for processing specific events. The metadata wizard 304, in one embodiment, provides an easy to use graphical user interface to represent existing dimension information in the metadata outline file. The metadata wizard 304 also manages multiple versions of the metadata and allows the data analyst to chose a specific version when annotating the OM. In one embodiment, the OM and metadata outline are represented in XML as shown in the blocks 306 and 308, respectively. The OM and metadata outline, in one embodiment, are annotated by an OM editor ("OME") annotation wizard 310.

In one embodiment, the OM is annotated such as to capture sufficient information for the data warehouse schema. The annotation step takes an OM and an existing data warehouse metadata as input. The data analyst selects each relevant metric and annotates it either as a dimension or as a measure. The metrics that are part of a dimension are further annotated to provide the dimensionLevel (for representing dimension hierarchies such as day→month→year). The metrics that represent key performance indicators (KPIs) are annotated as measures. Each measure metric is further annotated to indicate the dimensions on which it depends. The OME annotation wizard 310, in one embodiment, produces an OM with annotations in XML as shown in block 312.

A data schema generator 314 generates the metadata definitions for the data warehouse 106 based on the metadata outline 308. The metadata, in one embodiment, is derived from the business models (e.g., BOM model, business process execution language ("BPEL") model, or the like. The metadata generating process, in one embodiment, begins with the importation of the specific business model such as an OM. Monitoring objectives (e.g., identifying metrics dimensions and metrics to dimensions relationship artifacts, and the like.) are determined.

This is done, for example, by selecting the parts and aspects of the process that should be monitored and analyzed. The level of granularity, i.e., the level of detail for the monitoring and analysis, is then defined. The metric fact definitions and the dimension definitions are generated. In one embodiment, the definitions are linked to a semantic net, e.g., captured in Resource Description Framework (RDF). Finally, fact table definitions are reported into a relational metadata base (not shown). This relational metadata base (not shown) includes the correlated data definitions with the specific semantic hierarchical data.

The complete set of metadata generated by the metadata generator 314 allows the generation of Data Definition Language ("DDL") for constructing the data warehouse 106. The metadata describes the fact tables, dimension tables, and links the dimensions with a semantic net. The semantic net is used to describe meta data that is difficult to manage with relational databases, such as hierarchies (e.g., hierarchies for dimensions of on-line analytical processing ("OLAP") cubes, which are further described at http://www.olapreport.com/fasmi.htm and is hereby incorporated by reference in its entirety). Based on the OM and metadata, a data schema generator 316 generates a data schema for the OM. The data schema is then stored in a relational database 318 such as International Business Machine's DB2 UDB.

In an adaptive warehouse, the data schemas are updated to reflect changes, for example, in an OM. The logic flow diagram 300 also shows a new OM 320 extended with annotations in XML. As described above, a new OM, in one embodiment, is a newer version of an already existing OM. A data schema and metadata evolution engine 322,324 allow for the generation of DDL based on the differences between the new OM 320 and old OM 312. The data schema(s) associated with the already existing OM 312 are updated to reflect the changes in the new OM 320.

Monitoring Context Example

Figure 4:
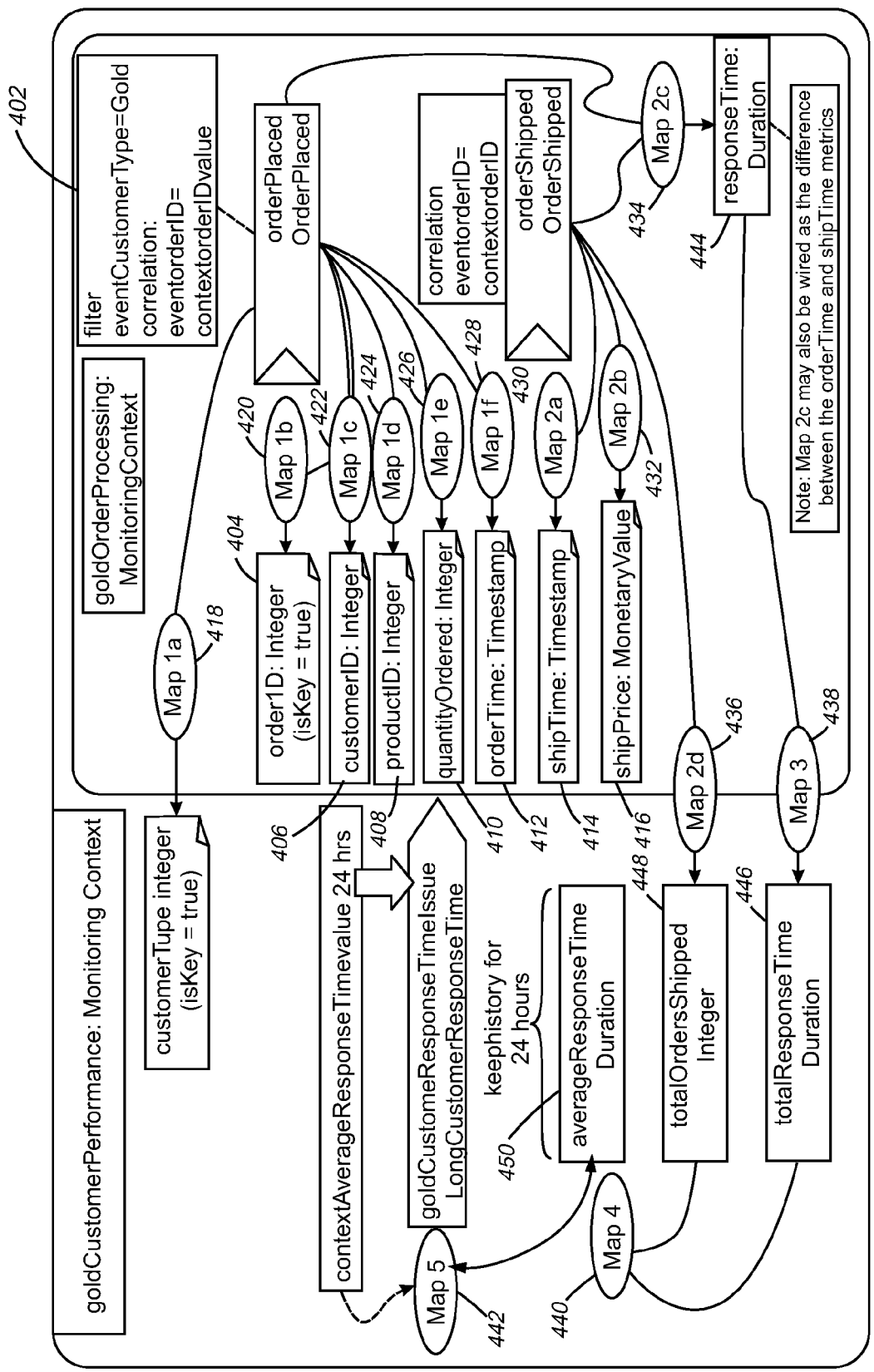
FIG. 4 is a logic flow diagram illustrating an exemplary monitoring context, according to an embodiment of the present invention.

FIG. 4 illustrates an exemplary monitoring context 400. It should be noted that the present invention is not limited to the exemplary monitoring context 400 of FIG. 4. The monitoring context 400 captures the monitoring requirements for tracking the performance of a purchase order processing system for "gold" customers. Thus, the filter 402 (in the top-right corner) specifies that this monitoring context 400 is activated whenever there is an event related to a purchase order made by a gold customer. In response to such an event, multiple fields of the event are extracted and represented as metrics: ordered 404, customerID 406, productID 408, quantityOrdered 410, orderTime 412, shipTime 414, and shipPrice 416. Also, additional aggregate metrics are derived from the above, through maps (calculation formulas) such as maps $1a$ 418 through map 5 442. These additional aggregate metrics as shown in FIG. 4 as responseTime 444, totalResponseTime 446, totalOrdersShipped 448, averageResponseTime 450.

Exemplary Data Warehouse Schema

FIG. 5 shows an exemplary warehouse data schema 116, according to an embodiment of the present invention. The exemplary data schema 116 shown is FIG. 5 is a star schema. It should be noted that a star schema is only one example of a data schema and any type of data schema can be used with the present invention. The data schema 116 is associated with an observation model. The data schema 116 includes a fact table 502, which is surrounded by a measure dimension table 504 and other dimension tables such a customer dimension table 506, a product dimension table 508, an order dimension table 510, and a time dimension table 512. For simplicity, only the measure dimension table 504 is shown is further detail.

As described above, the fact table 502, in one embodiment, includes metrics (facts), measurements, and the like of a specific process such as a business process being monitored. For example, FIG. 5 shows optional facts, which also include optional measures, such as "MEASURE ID=100" 538 and "CUSTOMER ID=1001" 540. It should be noted that other types of information can also be included in the fact table 502. The fact table 502 also includes foreign keys that refer to primary keys in one of the dimension tables 506, 508, 510, 512. For example, the MEASURE_ID 514, CUSTOMER_ID 516, TIME_ID 518, ORDER_ID 520, and PRODUCT_ID 522 keys in the fact table 502 are a foreign keys because they points to a respective primary key such as MEASURE_ID 524, CUSTOMER_ID 526, TIME_ID 528, ORDER_ID 530, and PRODUCT_ID 532 CUSTOMER_ID 516 in the measure, customer, time, order and product dimension tables 504, 506, 512, 510, 508, respectively. Each of the dimension tables can have other fields as well. For example, the CUSOMTER dimension table 506 can have fields such as CUSTOMER_ID 526, CUST_NAME 534, CUST_PHONE 536, where the CUSTOMER_ID 526 is the primary key because it is the field that is designated as the identifier of the table records.

The measure dimension table 504, in one embodiment, includes attributes/fields used to constrain and group data during a data warehouse query. The measures of a fact table determine what data is tracked and the dimensions determine how the data is tracked. The measure dimension table 504 stores information about the measure metrics being tracked by the data warehouse. Thus, for each measure metric, the measure dimension table 504 stores one record capturing a numerical identifier, for example, MEASURE_ID, a name (MEASURE_NAME), the name of the fact table where values for this measure are stored (FACT_TABLE_NAME) and a numerical identifier for the monitoring context (CONTEXT_ID) and potentially other necessary information.

Figure 6:
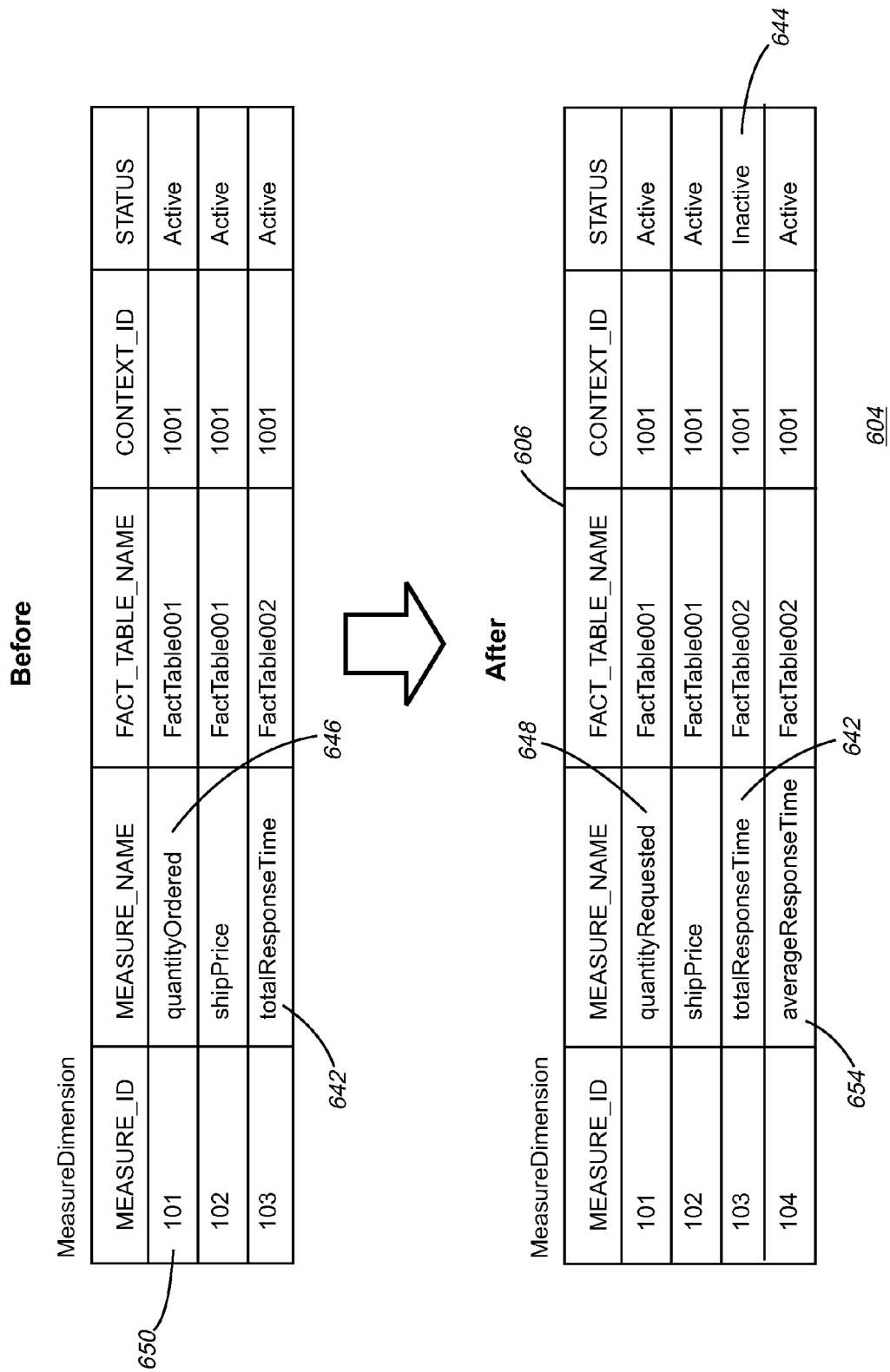
FIG. 6 illustrates an exemplary measure dimension table before and after changes have been made to an associated observation model, according to an embodiment of the present invention.

One advantage of the present invention is that when a new OM is generated that is related to an exiting OM the data from the data schema 116 does not have to be migrated into a new data schema for the new OM. FIG. 6 illustrates a measure dimension table 604 prior to any changes occurring and the dimension table 606 after changes to an OM has occurred. For example, the changes made in the new OM are propagated through the data schema 116 thereby updating the data schema 116. In other words, the fact table 502 and the dimension tables 504, 604, 506, 508, 510, 512 are updated with the relevant changes. This minimizes the downtime of the data warehouse 106 and the disruption of the existing data.

For example, if the change in the new OM is the removal of a measure metric in the existing OM, no change occurs in the warehouse data schema 116. Data is prevented from being stored in the corresponding fact table for the measure metric that was removed from the new OM. In one embodiment, the associated measure dimension table 604 is updated to identify that the measure metric that has been removed from the new OM is no longer in use. For example, in one embodiment, a measure metric such as "totalResponseTime" 542, is labeled as "inactive" in the updated measure dimension table 606.

If the change in the new OM is the renaming of an existing measure metric, no change occurs in the warehouse data schema. For example, the "quantityOrdered" metric 646 is renamed as the "quantity Requested" metric 648 in the updated table 606. The existing ID 650 of the quantityOrdered" metric 646 is used in the corresponding fact table and the updated measure dimension table 606. FIG. 6 also shows the addition of a new measure metric. For example, in the updated measure dimension table 606, the measure metric "averageResponseTime" 654 has been added.

If the change in the new OM is the addition of a new dimension metric, the corresponding fact table is extended by adding a new column with the foreign key to this new dimension. In one embodiment, all existing metrics (facts) have a null value for this column. If the change in the new OM is the removal of an existing dimension metric, no change occurs to the warehouse data schema 116. In one embodiment, a null value is inserted in the foreign key column in the corresponding fact table from this point forward. If the change in the new OM is the renaming of an exiting dimension metric, the foreign key column name, in one embodiment, is changed to reflect the new name.

As described above, the change in the new OM can also be the addition or removal of a monitoring context. If the change is the addition of one or more monitoring contexts, the data schema updater 114 or other appointed component determines if the set of dimension metrics of this new monitoring context is the same as an existing one. If this is the case, the corresponding fact table associated with the existing monitoring context is reused for the new monitoring context. If the set of dimension metrics are not the same, a new fact table is created for the new monitoring context. Also, in one embodiment, the new measure metrics in the new monitoring context are registered in the measure dimension table 604.

If the change in the new OM is the deletion of an exiting monitoring context, no change occurs in the warehouse data schema 116. In one embodiment, all of the measure metrics associated with the monitoring context removed from the new OM are identified in the associated dimension table 604 as being no longer in use. For example, in one embodiment, the measure metrics are marked as "inactive" in the measure dimension table 504.

Exemplary Process for Updating Data Schemas

Figure 7:
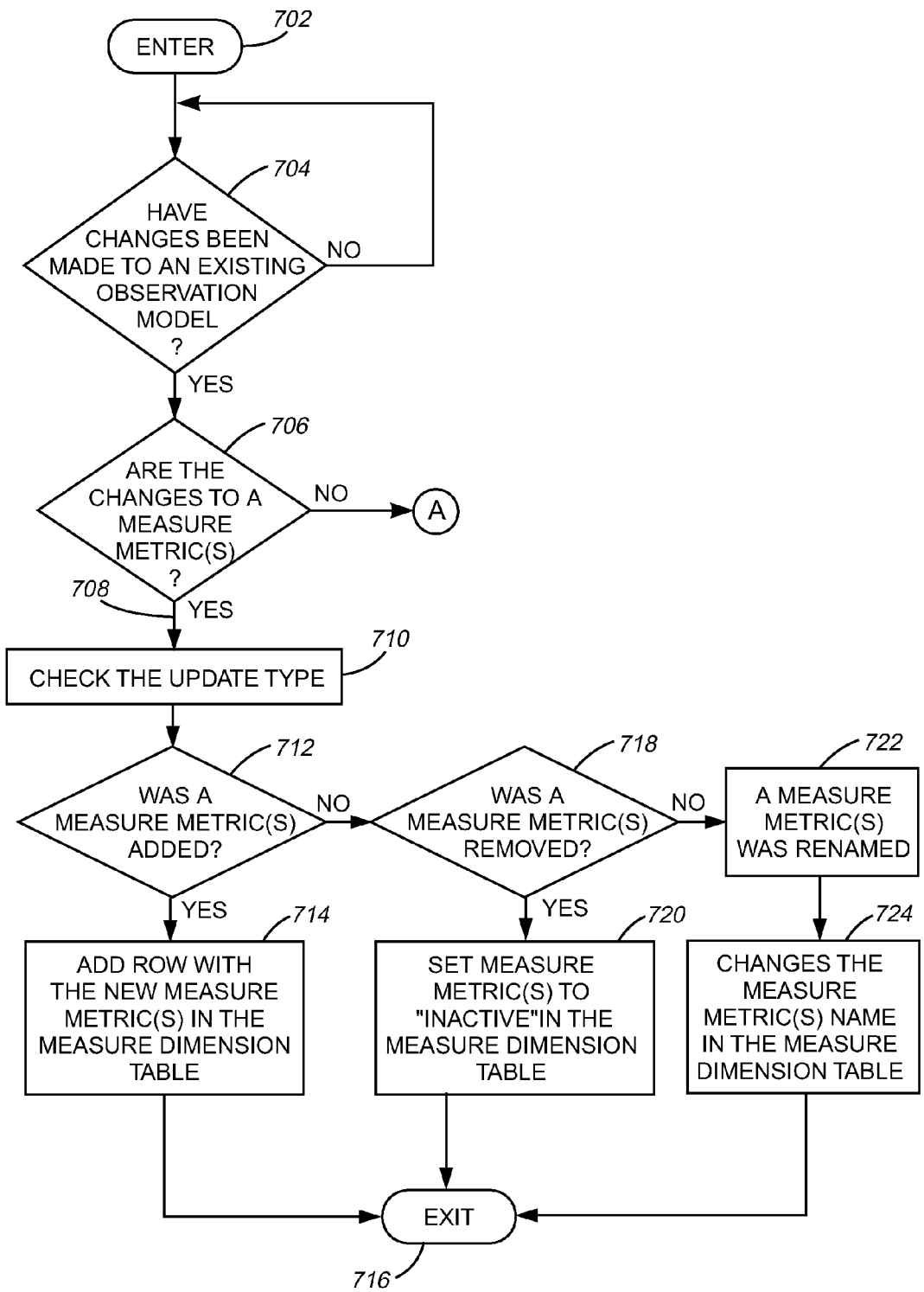
FIG. 7 is an operational flow diagram illustrating an exemplary process of updating a data warehouse schema based on changes to a measure metric in an observation model, according to an embodiment of the present invention.

FIG. 7 shows an exemplary process of updating a data schema based on changes to measure metrics in an observation model. The operational flow diagram of FIG. 7 begins at step 702 and flows directly to step 704. The information processing system 102, at step 704, determines if changes have been made to an existing observation model. For example, a newer OM can be created by the information processing system 102 or another system. The observation model comparator 110, at step 706, determines if the differences between the new OM and the existing OM are to measure metrics within a monitoring context. If the result of this determination is negative, the control flows to entry point A of FIG. 8. If the result of this determination is positive, the observation model comparator 110, at step 708, checks the update type.

The observation model comparator 110, at step 712, determines if one or more measure metrics were added. If the result of this determination is positive, the data schema updater 114, at step 714, adds a row(s) with the new measure metric(s) in the measure dimension table 504. The data for the new measure metric is stored in an existing fact table 502 for the given monitoring context. A change in the associated warehouse data schema 116 does not occur. The data schema updater 114, in one embodiment, uses data schema modifications generated by the data schema modification generator 112 to update the data schema 116. The control flow then exits at step 716.

If the result of the determination at step 712 is negative, the observation model comparator 110, at step 718, determines if one or more measure metrics in the existing OM have been removed from the new OM. If the result of this determination is positive, the data schema updater 114 updates the associated measure dimension table 504 to identify that the measure metric that has been removed from the new OM is no longer in use. For example, in one embodiment, the measure metric is labeled as "inactive" in the associated measure dimension table 504. Identifying the measure metric as no longer in use prevents data from being stored in the fact table 502 for the measure metric that was removed from the new OM. A change in the warehouse data schema 116 does not occur. The control flow then exits at step 716.

If the result of this determination is negative, the observation model comparator 110, at step 722, identifies that one or more measure metrics have been renamed. The data schema updater 114, at step 724, updates the measure metric name(s) in the measure dimension table 504 to reflect the name change. The existing ID of the measure metric is used in the fact table 502. A change in the warehouse data schema 116 does not occur. The control flow then exits at step 716.

Another Exemplary Process for Updating Data Schemas

FIG. 7 shows an exemplary process of updating a data schema based on changes to dimension metrics in an observation model. The control flow enters at entry point A from step 606 of FIG. 6. The observation model comparator 110, at step 702, determines if the differences between the new OM and the associated existing OM are with regards to a dimension metric. If the result of this determination is negative the control flows to entry point B of FIG. 8. If the result of this determination is positive, the observation model comparator 110, at step 704, checks the update type.

The observation model comparator 110, at step 706, determines if one or more dimension metrics were added. If the result of this determination is positive, the data schema updater 114, at step 708, adds a column including in the fact table 502 with a foreign key that is associated with the new dimension metric. In one embodiment, all existing metrics have a null value for this new column. The control flow then exits at step 710. If the result of this determination is negative, the observation model comparator 110, at step 712, determines if one or more dimension metrics in the existing OM have been removed from the new OM. If the result of this determination is positive, the data schema updater 114 updates the associated dimension table 504 to identify include null values in the foreign key column in the fact table 502. A change in the warehouse data schema 116 does not occur. The control flow then exits at step 710. If the result of the determination at step 712 is negative, the observation model comparator 110, at step 716, identifies that one or more dimension metrics have been renamed. The data schema updater 114, at step 718, updates the associated column name in the fact table 502 to reflect the name change. The control flow then exits at step 710.

Another Exemplary Process for Updating Data Schemas

Figure 8:
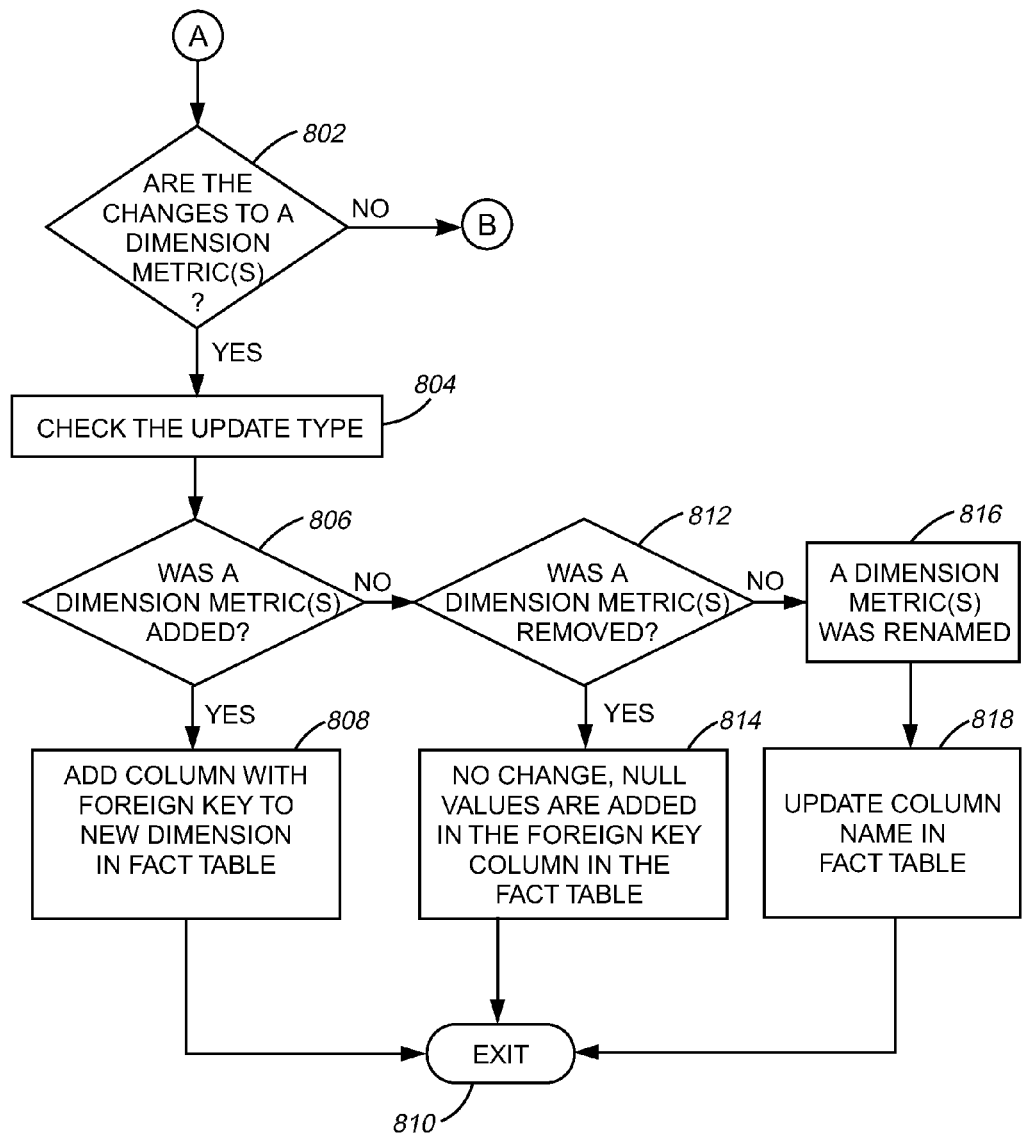
FIG. 8 is an operational flow diagram illustrating an exemplary process of updating a data warehouse schema based on changes to a dimension metric in an observation model, according to an embodiment of the present invention.
Figure 9:
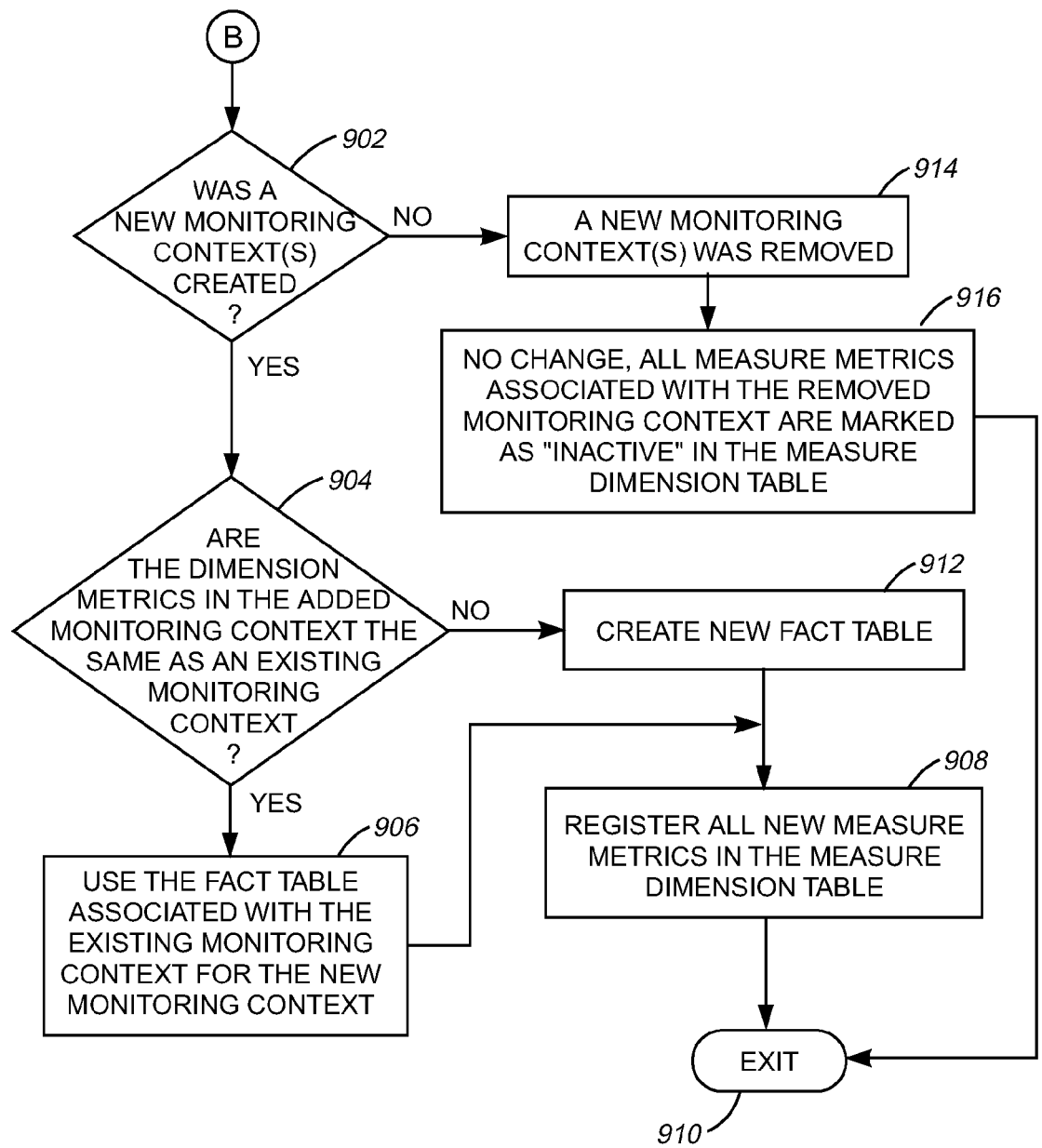
FIG. 9 is an operational flow diagram illustrating an exemplary process of updating a data warehouse schema based on the addition/removal of monitoring contexts in an observation model, according to an embodiment of the present invention.

FIG. 8 shows an exemplary process of updating a data schema based on monitoring contexts being added and/or deleted in an observation model. The control flow enters at entry point B from step 702 of FIG. 7. The observation model comparator 110, at step 802, determines if one or more new monitoring contexts have been added to the new OM. If the result of this determination is positive, the observation model comparator 110, at step 804, determines if the dimension metrics in the added monitoring context are the same as an existing monitoring context in the already existing OM.

If the result of this determination is positive, the data schema updater 114, at step 806, associates the fact table 502 of the existing monitoring context for the new monitoring context. All of the new measure metrics, at step 808, in the new monitoring context are registered in the measure dimension table 504. The control flow then exits at step 810. If the result of the determination at step 804 is negative, a new fact table, at step 812, is created for the new monitoring context. All of the new measure metrics, at step 808, in the new monitoring context are then registered in the measure dimension table 504. The control flow then exits at step 810.

If the result of the determination at step 802 is negative, the observation model comparator 110, at step 814, identifies that one or more monitoring contexts in the existing OM have been removed from the new OM. The data schema updater, at step 816, updates the associated measure dimension table 504 to identify that the measure metrics associated with the removed mentoring context are no longer in use. For example, in one embodiment, the measure metrics are labeled as "inactive" in the associated measure dimension table 504. A change in the warehouse data schema 116 does not occur. The control flow then exits at step 810.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on an information processing system for modifying at least one data warehouse schema based on detected changes in an associated observation model, the method comprising:

determining if at least one new observation model has been created, wherein an observation model is separate and distinct from a data schema, and wherein an observation model models a business process and comprises a set of annotations identifying metrics associated with observation model as one of a dimension and a measure;

determining if at least one existing observation model is associated with the new observation model;

in response to the existing observation model being associated with the new observation model, identifying at least one changed attribute by comparing the new observation model and the existing observation model, wherein the at least one changed attribute is at least one or more of measure metrics of a monitoring context, dimension metrics of a monitoring context, and monitoring contexts, wherein a monitoring context generates at least one of a set of measure metrics and a set of dimension metrics for a given observation model;

generating, based on the at least one changed attribute, a data definition language; and updating, based on the data definition language, a data schema associated with the existing observation model, wherein the updating comprises updating a set of files associated with the existing observation model to reflect the changed attribute between the new observation model and the existing observation model, wherein the updating further comprises updating at least one existing fact table associated with the existing monitoring context so that at least one pointer entry is marked as inactive, wherein marking the at least one pointer entry as inactive prevents data associated with the at least one pointer entry from being stored in the at least one existing fact table.

2. The method of claim 1, wherein the identifying the changed attribute in the new observation model further comprises identifying that one more new measure metrics have been added to at least one monitoring context associated with the new observation, wherein the monitoring context is substantially similar to at least one existing monitoring context associated with the existing observation model.

3. The method of claim 1, wherein the identifying the changed attribute in the new observation model further comprises identifying that the changed attribute in the new observation model is that one or more existing measure metrics associated with the existing monitoring context have been removed from the substantially similar monitoring context associated with the new observation model, wherein the set pointer entry being associated with the existing dimension metric that has been removed from the substantially similar monitoring context associated with the new observation model.

4. The method of claim 1, wherein the identifying the changed attribute in the new observation model further comprises identifying that the one or more existing measure metrics have been renamed in the substantially similar monitoring context.

5. The method of claim 1, wherein the identifying the changed attribute in the new observation model further comprises identifying that one or more dimension metrics have been added to the substantially similar monitoring context associated with the new observation model.

6. The method of claim 1, wherein the identifying the changed attribute in the new observation model further comprises identifying that one more existing dimension metrics have been renamed in the substantially similar monitoring context.

7. The method of claim 1, wherein the identifying the changed attribute in the new observation model further comprises identifying that one or more new monitoring contexts have been added to the new observation model.

8. The method of claim 1, wherein the identifying the changed attribute in the new observation model further comprises identifying that at least one monitoring context associated with the existing observation model has been removed from the new observation model.

9. An information processing system for modifying at least one data warehouse schema based on detected changes in an associated observation model, the information processing system comprising:
a memory;
a processor communicatively coupled to the memory;
an observation model comparator communicatively coupled to the memory and the processor, the observation model comparator configured to perform a method comprising
determining if at least one new observation model has been created, wherein an observation model is separate and distinct from a data schema, and wherein an observation model models a business process and comprises a set of annotations identifying metrics associated with observation model as one of a dimension and a measure;
determining if at least one existing observation model is associated with the new observation model;
identifying, in response to the existing observation model being associated with the new observation model, at least one changed attribute by comparing the new observation model and the existing observation model, wherein the at least one changed attribute is at least one or more of
measure metrics of a monitoring context,
dimension metrics of a monitoring context, and
monitoring contexts,
wherein a monitoring context generates at least one of a set of measure metrics and a set of dimension metrics for a given observation model; and
a data schema updater communicatively coupled to the memory and the processor configured to perform a method comprising generating, based on the at least one changed attribute, a data definition language; and
updating, based on the data definition language, a data schema associated with the existing observation model, wherein the updating comprises updating a set of files associated with the existing observation model to reflect the changed attribute between the new observation model and the existing observation model, wherein the updating further comprises updating at least one existing fact table associated with the existing monitoring context so that at least one pointer entry is marked as inactive, wherein marking the at least one pointer entry as inactive prevents data associated with the at least one pointer entry from being stored in the at least one existing fact table.

10. The information processing system of claim 9, wherein the identifying the changed attribute in the new observation model further comprises identifying that one more new measure metrics have been added to at least one monitoring context associated with the new observation, wherein the monitoring context is substantially similar to at least one existing monitoring context associated with the existing observation model.

11. The information processing system of claim 9, wherein the identifying the changed attribute in the new observation model further comprises identifying that the changed attribute in the new observation model is that one or more existing measure metrics associated with the existing monitoring context have been removed from the substantially similar monitoring context associated with the new observation model.

12. The information processing system of claim 9, wherein the identifying the changed attribute in the new observation model further comprises identifying that one or more existing measure metrics have been renamed in the substantially similar monitoring context.

13. The information processing system of claim 9, wherein the identifying the changed attribute in the new observation model further comprises identifying that one or more dimension metrics have been added to the substantially similar monitoring context associated with the new observation model.

14. The information processing system of claim 9, wherein the identifying the changed attribute in the new observation model further comprises identifying that one more existing dimension metrics have been renamed in the substantially similar monitoring context.

15. The information processing system of claim 9, wherein the identifying the changed attribute in the new observation model further comprises identifying that one or more new monitoring contexts have been added to the new observation model.

16. The information processing system of claim 9, wherein the identifying the changed attribute in the new observation model further comprises identifying that at least one monitoring context associated with the existing observation model has been removed from the new observation model.

17. A non-transitory computer readable medium for modifying at least one data warehouse schema based on detected changes in an associated observation model, the computer readable medium comprising:
a storage medium readable by a processing circuit and storing instructions for execution by the processing circuit for performing a method comprising:
determining if at least one new observation model has been created, wherein an observation model is separate and distinct from a data schema, and wherein an observation model models a business process and comprises a set of annotations identifying metrics associated with observation model as one of a dimension and a measure;

determining if at least one existing observation model is associated with the new observation model;

in response to the existing observation model being associated with the new observation model, identifying at least one changed attribute by comparing the new observation model and the existing observation model, wherein the at least one changed attribute is at least one or more of measure metrics of a monitoring context, dimension metrics of a monitoring context, and monitoring contexts, wherein a monitoring context generates at least one of a set of measure metrics and a set of dimension metrics for a given observation model; and generating, based on the at least one changed attribute, a data definition language; and updating, based on the data definition language, a data schema associated with the existing observation model, wherein the updating comprises updating a set of files associated with the existing observation model to reflect the changed attribute between the new observation model and the existing observation model, wherein the updating further comprises updating at least one existing fact table associated with the existing monitoring context so that at least one pointer entry is marked as inactive, wherein marking the at least one pointer entry as inactive prevents data associated with the at least one pointer entry from being stored in the at least one existing fact table.

18. The non-transitory computer readable medium of claim 17, wherein the identifying the changed attribute in the new observation model further comprises identifying that one more new measure metrics have been added to at least one monitoring context associated with the new observation, wherein the monitoring context is substantially similar to at least one existing monitoring context associated with the existing observation model.

19. The non-transitory computer readable medium of claim 17, wherein the identifying the changed attribute in the new observation model further comprises identifying that the changed attribute in the new observation model is that one or more existing measure metrics associated with the existing monitoring context have been removed from the substantially similar monitoring context associated with the new observation model.

20. The non-transitory computer readable medium of claim 17, wherein the identifying the changed attribute in the new observation model further comprises identifying that one or more existing measure metrics have been renamed in the substantially similar monitoring context.

* * * * *